United States Patent [19]
Held

[11] Patent Number: 5,125,812
[45] Date of Patent: Jun. 30, 1992

[54] APPARATUS FOR FABRICATING PROCESSED WOOD MATERIAL PANELS

[76] Inventor: Kurt Held, Alte Str. 1, D-7218 Trossingen 2, Fed. Rep. of Germany

[21] Appl. No.: 596,738

[22] Filed: Oct. 11, 1990

Related U.S. Application Data

[62] Division of Ser. No. 285,773, Dec. 16, 1988, Pat. No. 4,988,478.

[30] Foreign Application Priority Data

Dec. 16, 1987 [DE] Fed. Rep. of Germany ....... 3742652

[51] Int. Cl.⁵ ............................................. B29C 43/22
[52] U.S. Cl. ........................................ 425/5; 264/121; 264/122; 425/371; 425/465.1
[58] Field of Search ................. 425/5, 6, 371, 370, 425/372, 405.1; 264/5, 12, 118, 121, 122

[56] References Cited

U.S. PATENT DOCUMENTS

| | | | |
|---|---|---|---|
| 3,325,859 | 6/1967 | Goldstein | 425/371 |
| 3,880,975 | 4/1975 | Lundmark | 264/121 |
| 3,942,929 | 3/1976 | DeMets | 425/371 |
| 4,172,869 | 10/1979 | Oishi et al. | 425/371 |
| 4,324,753 | 4/1982 | Gill | 264/121 |
| 4,344,787 | 8/1982 | Wang et al. | 425/6 |
| 4,485,733 | 12/1984 | Held | 425/371 |
| 4,541,889 | 9/1985 | Held | 425/371 |
| 4,548,133 | 10/1985 | Held | 425/371 |
| 4,589,948 | 5/1986 | Held | 425/371 |
| 4,670,035 | 6/1987 | Lee et al. | 425/6 |
| 4,693,860 | 9/1987 | Thelen | 264/118 |
| 4,802,837 | 2/1989 | Held | 425/230 |

FOREIGN PATENT DOCUMENTS

| | | |
|---|---|---|
| 2948989 | 3/1981 | Fed. Rep. of Germany . |
| 53-32369 | 9/1978 | Japan . |
| 61-281137 | 12/1986 | Japan . |

*Primary Examiner*—Jay H. Woo
*Assistant Examiner*—W. J. Matney, Jr.
*Attorney, Agent, or Firm*—Akoo-Toren

[57] ABSTRACT

In the fabrication of wood material panels, processed wood particles are coated with a binder free of a hardener and then are spread in a fleece on a support surface. The fleece is then compacted and pressed to form the panel. Before the compacting step, microcapsules are introduced into the fleece. The microcapsules have enclosing walls that do not react with the binder and contain a hardener in the gaseous phase or in the binary phase with a gaseous carrier agent. When the fleece is compacted, the capsule walls are destroyed and the hardener is released into the fleece. The microcapsules containing the hardener are produced in a device located adjacent to the inlet end of the press so that there is only a short distance between the device and a mixing station where the microcapsules and the bonded processed wood particles are mixed. The mixing station is located just ahead of or at the spreading station where the mixed wood particles and microcapsules are formed into the fleece. The spreading station is located immediately adjacent the inlet to the press.

4 Claims, 4 Drawing Sheets

APPARATUS FOR FABRICATING PROCESSED WOOD MATERIAL PANELS

This is a divisional application of Ser. No. 07/285,773, filed Dec. 16, 1988 now U.S. Pat. No. 4,988,478, issued Jan. 29, 1991.

BACKGROUND OF THE INVENTION

The present invention is directed to a process of and apparatus for fabricating processed wood material panels similar to the apparatus disclosed in U.S. patent application No. 120,355, filed Nov. 13, 1987, now U.S. Pat. No. 4,882,837 issued Feb. 17, 1989. Processed wood material panels, such as chip board, fiber board, OSB (oriented structural fiberboard) panels, MDF (medium density fiberboard) panels and the like are produced from wood particles bonded together by a binder, such as urea, melamine and phenolformaldehyde resins with the addition of a hardener for effecting the curing of the panel. Initially, the wood material, along with the binder, is spread on a support surface to form a fleece which is subsequently compacted and pressed to form the panel. The hardener is introduced into the bonded wood particles before the fleece undergoes the compacting and compressing steps.

Such wood material panels as mentioned above are formed of wood chips, wood fibers and the like, bonded together by a binder. Usually, the binder is a urea, melamine or phenolformaldehyde resin. The wood material particles containing the binder are spread to form a fleece and the fleece is compacted and pressed in a pressing device to form a compacted panel. To accelerate the curing or setting process, a hardener is added to the binder for the processed wood particles. The setting process can be accelerated by supplying heat within the press.

To shorten the pressing time and reduce the supply of heat, the processed wood particles are bonded with a binder free of hardener and subsequently are spread to form a fleece and then compressed to form the processed wood material panels as disclosed in the U.S. patent application mentioned above. During the compacting step, an acidic or basic hardener in the gaseous phase, or binary phase with a gaseous carrier agent is supplied in the press along the surface of the fleece or directly into the interior of the fleece. As a result, the gaseous hardener must diffuse from the surfaces of the fleece into its center or flow through the fleece from its interior in the direction of the fleece surfaces during the compacting step. Accordingly, the concentration of the hardener in the fleece varies sharply during the compacting step as considered along its thickness, so that the time for pressing the material must be extended until the hardener concentration is the same everywhere throughout the fleece. Variable hardener concentration leads to irregular curing of the binder so that the structural properties of the processed wood material panel, such as tensile strength, resistance to swelling and the like, are eventually harmed.

It has now been found that the process disclosed in the U.S. patent application No. 120,355, mentioned above, can be improved whereby the time to complete the pressing of the panel can be shortened while improving the structural properties of the panels.

SUMMARY OF THE INVENTION

Therefore, it is the primary object of the present invention to insure that the ratio of binder to hardener is consistent during the compacting step in the process as disclosed in the above-mentioned patent application.

In accordance with the present invention, the hardener is introduced into the wood particles containing the binder and is enclosed within microcapsules. Apparatus is provided for forming the microcapsules and introducing the microcapsules into the wood particles at or adjacent to the location where the wood particles are spread into a fleece.

In accordance with the present invention, there is the advantage that the hardener in a gaseous state or along with a gaseous carrier agent is located in the fleece during the compacting step and is released directly to the processed wood particles. Apparatus for supplying the gaseous hardener into the press is no longer needed. The ratio of the concentration of binder to hardener in the fleece is thereby constant during the entire compacting period, since there is no diffusion of the hardener through the fleece during compaction because of the initial uniform distribution of the hardener. As a result, improved structural properties of the processed wood panels result. The hardener released in the fleece reacts with the binder and cannot escape from the fleece. In addition, no further supply apparatus is needed in the press for the gaseous hardener and the gaseous hardener cannot escape into the surrounding environment. Accordingly, costly exhaust devices for the press are unnecessary. Damage to the press by generally very aggressive hardeners, such as hydrochloric gas and the like, is prevented in a reliable manner.

The various features of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DETAILED DESCRIPTION OF THE INVENTION

The process, according to the invention, can be carried out with a system for fabricating continually processed wood material panel webs, as well as with a discontinuous system for producing processed wood material panels with fixed dimensions. Generally, continuous processes use a double-band press, while discontinuous processes utilize single or multiple platen presses.

Figure 1:
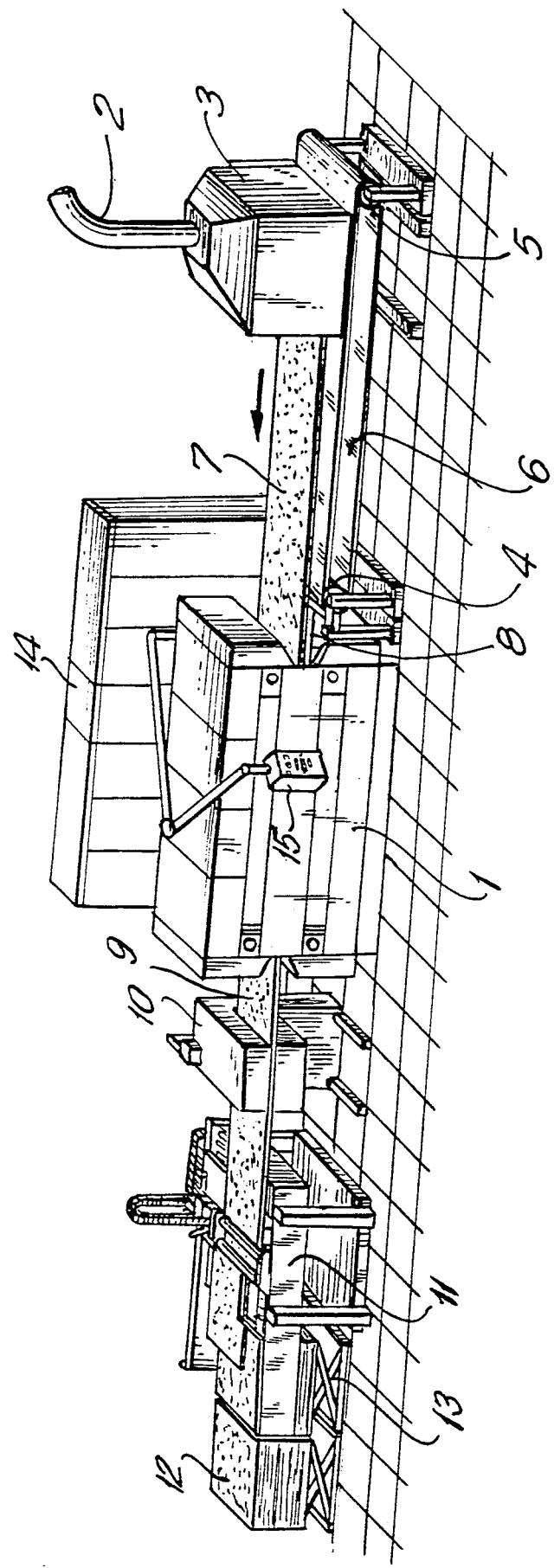
FIG. 1 is a perspective view of apparatus for the continuous fabrication of processed wood material panels.

In FIG. 1, a continuously operating system for fabricating chip boards is exhibited. In this system, the processed wood material particles are wood chips, which are prepared, pretreated and coated with a binder free of any hardener. These operations are carried out in known apparatus located upstream from the double-band press 1. The wood chips with the binder are directed to a spreading station 3, through a pipeline 2. Spreading station 3, located adjacent the inlet or entry into the double-band press 1, is located above a conveyor belt 6 trained around two reversing rollers 4, 5 and moving continuously in the direction of the arrow toward the inlet into the double-band press 1. In the spreading station 3, the wood chips and binder are spread together with microcapsules capsules onto the conveyor belt 6, and form a fleece 7, consisting of a chip cake. The microcapsules enclose a hardener in gaseous phase or binary phase with a gaseous carrier agent. The hardener reacts with the binder in setting the wood chip in the panel. The microcapsule wall is formed of a material which does not react with the binder. Accordingly, the microcapsules are introduced into the fleece 7 before the compacting step, in accordance with the invention, and the microcapsule wall prevents any premature reaction between the hardener and the binder in advance of the compacting operation.

In combination with the microcapsules, the fleece is carried by the conveyor belt 6 in the direction of the arrow into the double-band press 1. Other known devices, not shown in the drawing, such as control trolleys, pre-pressing means, and the like, can be positioned between the spreading station 3, and the double-band press 1. A transfer fitting or plate 8, guides the fleece 7 from the conveyor belt 6, into the inlet of the double-band press 1. The transfer plate 8 is located at the left end of the conveyor belt 6, as viewed in FIG. 1, adjacent the reversing roller 4. .As it enters the double-band press 1, fleece 7 is compacted until the final thickness of the chip board web 9 is attained and then the web is pressed with the application of pressure and possibly heat as the web is transported through the double band press.

Figure 2:
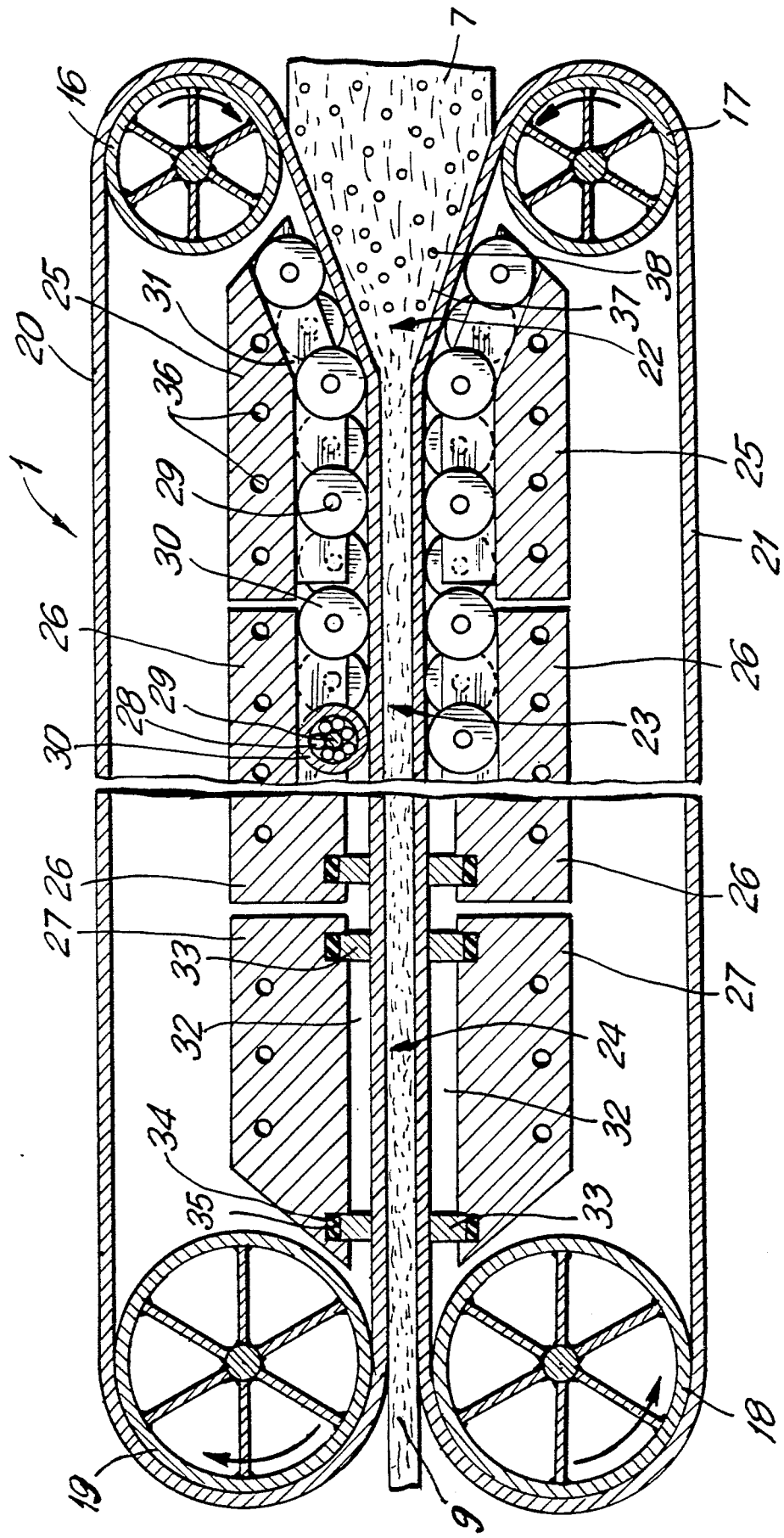
FIG. 2 is an enlarged cross sectional view of a double-bond press for compressing a fleece made up of processed wood particles.

Such a double-band press, suitable for pressing the fleece is shown in greater detail in FIG. 2. Double-band press 1 includes four rotatably supported reversing drums 16, 17, 18, 19. An upper endless press belt 20 and a lower endless press belt 21 are guided, respectively, about the upper reversing rollers 16, 19 and the lower reversing rollers 17, 18. The rotating direction of the press belts is indicated by the arrows shown within the reversing drums 16, 17. Fleece 7 is guided through the double-band press 1 between the oppositely located portions of the upper and lower press belts 20, 21. Initially, fleece 7 is compacted in a wedge shaped inlet region 22, then it is pressed in an average or medium pressure reaction zone 23 with a constant gap width and subsequently moves through a low pressure shape-maintenance zone 24, with the compacted and pressed chip board web 9 finally exiting from the double-band press 1 at the outlet between the reversing drums 18, 19.

The pressure acting on the fleece 7 is exerted by pressure plates arranged in a press frame of the double-band press 1. At the left-hand end of the double-band press 1, as viewed in FIG. 2, pressure plates 25 are located within the upper and lower press belts 20, 21 and have a wedge shape at the left-hand ends of the plates forming a wedge-shape inlet to the double-band press 1. The wedge shape of the pressure plates 25 provides the wedge shaped configuration of the inlet region 22. Pressure plates 26, 27 for the average pressure reaction zone 23 and the low pressure shape maintenance zone 24 have a substantially rectangular cross section. A roller bed for transmitting the pressure from the pressure plates 25 to the press belts 20, 21 is located between the pressure plates and the press belts. The roller bed, arranged to be stationary in the double-band press 1, includes rollers 30 offset relative to one another and supported on shafts 29 by needle roller bearings 28. Shafts 29 are secured in support strips 31 and the support strips are, in turn, fastened to the pressure plates 25, at locations remote from the press belts 20, 21. The further construction of such a roller bed can be effected in accordance with DE-OS 31 23 291 corresponding to U.S. Pat. No. 4,548,133, or DE-OS 33 04 754 corresponding to U.S. Pat. No. 4,485,733.

In addition, such roller beds can be located in the average pressure reaction zone 23 and the low pressure shape maintenance zone 24 between the pressure plates 26, 27 and the press belts 20. 21. As an alternative, however, a pressure chamber 32 can also be provided between the pressure plates and the press belts. Such a pressure chamber 32, as shown in FIG. 2, is bordered along its sides by a floating packing 33 in the form of a frame-like enclosure extending around the outer edges of the pressure chamber 32. Floating packing 33 fits into a groove 34 in the pressure plates 26, 27 and is acted upon from the base of the groove 34 by a pressure means acting on an O-ring belt 35 pressing against the floating packing. The floating packing is pressed against the associated press belt 20, 21, so that the packing can slide relative to the press belt. A pressurized fluid medium is introduced into the pressure chambers 32 for exerting pressure on the press belts 20, 21 for compressing the chip board web.

Reaction forces exerted by the fleece 7 are introduced into the press frame through the pressure plates 25, 26, 27. The press frame, disclosed in DE-OS 32 34 082 corresponding to U.S. Pat. No. 4,589,548, is omitted from the drawing for the sake of simplicity.

Bores 36 extend through the pressure plates 25, 26, 27 transverse of the movement of the web between the press for conducting a heated thermal oil in the event it is desired to heat the pressure plates. Similarly, if cooling of the pressure plates is desired, which may be necessary in the pressure plate 27 of the low-pressure shape maintenance zone 24, a coolant can be conducted through the bores 36. Rollers 30 in the roller bed or additional heat-conducting elements in the pressure chambers 32, as disclosed in DE-OS 33 25 578 corresponding to U.S. Pat. No. 4,541,889, serve to transmit heat from the pressure plate to the press belt or to transfer heat from the press belt to the pressure plate. At the inlet into the double band press 1, press belts 20, 21 can also be heated at the reversing drums 16, 17 in the event the inlet region is to be heated. Heat is transferred from the pressure belts 20, 21 by heat conductance into the fleece 7 being pressed.

Fleece 7 entering the double-band press at the right-hand side in FIG. 2, is a mixture of wood chips 37 including the binder free of the hardener and with microcapsules 38 containing the hardener. As it enters the double-band press 1, fleece 7 is continuously compacted until the final thickness of the chip board web 9 is achieved in the wedge shaped inlet region 22 of the press. During this compacting operation, the microcapsule walls are destroyed and release the hardener in the gaseous phase or in a binary phase with a gaseous carrier agent. Since the microcapsules 38 are present throughout the entire fleece 7, the hardener is uniformly distributed throughout the thickness of the fleece 7, directly in contact with the wood chips 37, for effecting the setting reaction of the resin binder covering the wood chips. Since it is not necessary for the gaseous hardener or the gaseous carrier agent for the hardener to diffuse through the fleece, its concentration throughout the fleece is constant whereby the setting or curing operation proceeds more uniformly and rapidly. To accelerate the setting operation, heat can be supplied to the fleece 7 via the press belts 20, 21. As an alternative, it is possible to heat the binder and wood chips 37 to the process temperature generally about 90°–130° C., prior to spreading the wood chips into the fleece 7, since there is no danger of any premature hardening or setting without the application of pressure in advance of the double-band press, because the binder is free of the hardener. After the compacting operation in the wedge-shaped inlet region 22, the average and low pressure regions follow in the double-band press 1, in which the fleece under the application of area pressure, sets to form the chip board web 9.

Chip board web 9 exits the double-band press after passing the low pressure shape maintenance zone 24 at the outlet located at the reversing drums 18, 19. The web leaves the double-band press with a uniform velocity and is processed further in the portions of the apparatus located downstream from the double-band press 1. If necessary, chip board web 9, can move through a cooling section for additional cooling after leaving the double-band press 1. As shown in FIG. 1, chip board web 9 is ground to its final dimensions in a grinding station 10. Subsequently, chip board web 9 is divided into individual chip board panels 12 of the desired dimensions in a transversely extending cutting station 11 and then is stacked on pallets in a stacking device 13 for shipping. The sequence of the entire process of the system shown in FIG. 1 is controlled by a computer located in a control box or console 14. The system operator can input parameters for the computer control via a data terminal 15.

In carrying out the process of the present invention, vertically arranged double band presses or intermittently operated single or multiple platen presses, as described in a number of the embodiments in patent application No. 120,355, mentioned above, can be used in place of the double band press as described. A particular advantage is gained over the equipment disclosed in patent application No. 120,355 when utilizing the claimed process, in that the supply lines for the gaseous hardener in the press are dispensed with, whereby the cost of the press is reduced.

Figure 3:
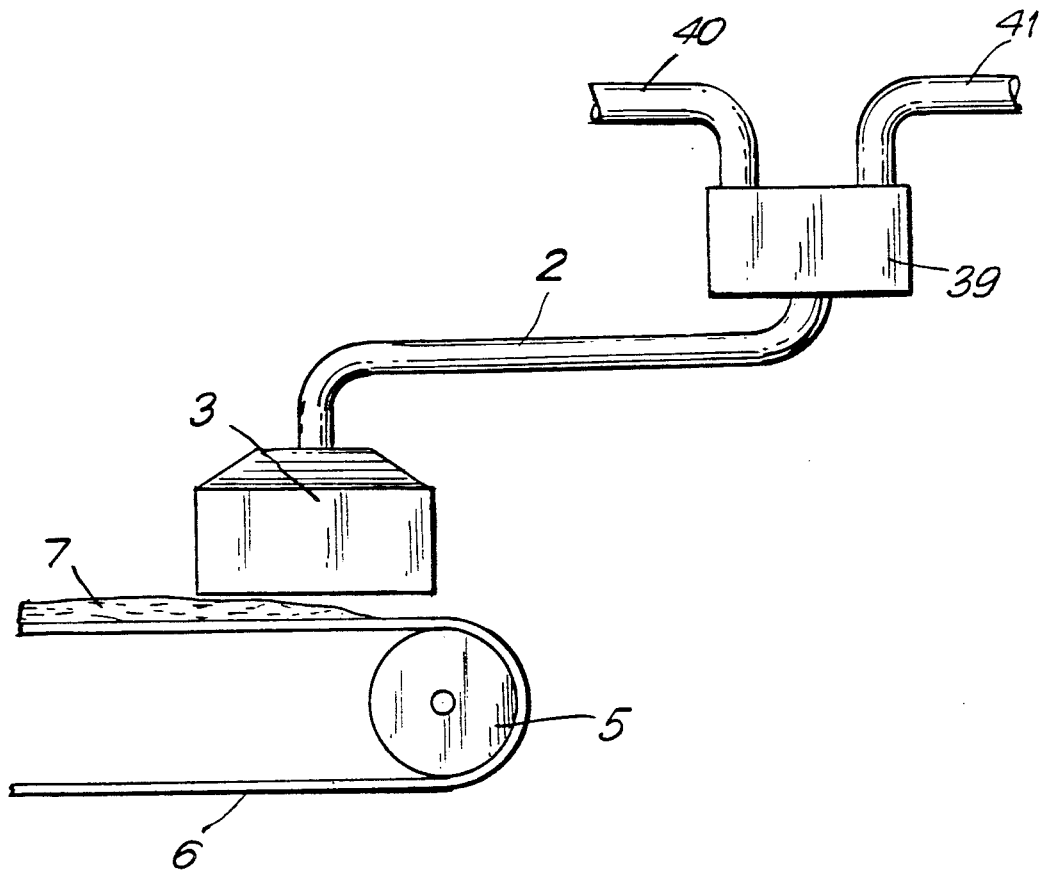
FIG. 3 is a schematic view illustrating a device for spreading processed wood particles.

In the simplest manner, the microcapsules 38 are introduced into the fleece 7 by mixing them with the wood chips 37, including the binder but without the hardener, and subsequently spreading the microcapsules and wood chips to form the fleece 7. As an alternative, the microcapsules can be mixed with the wood chips 37 while spreading the wood chips to form the fleece 7. Such a device for spreading the wood chips 7 is set forth in FIG. 3. This device includes a spreading station 3 and a mixing station 39, connected together by a pipeline 2. A line 40 supplies the binder and wood chips to the mixing station 39 and another line 41 extends from a device 47, note FIG. 5, where the microcapsules 38 are produced. The wood chips 37, along with the binder, but without the hardener, are fed pneumatically into the mixing station 39 through the line 40. Microcapsules 38 are fed pneumatically into the mixing station 39 from the microcapsule production device 47 through the line 41. Wood chips 37 and microcapsules 38 are uniformly mixed in the desired ratio within the mixing station. The mixture of wood chips 37 and microcapsules 38 is then fed via the pipeline 2 to the spreading station 3 where the mixture of wood chips and microcapsules is spread on the conveyor belt 6 to form the fleece 7. Spreading station 3 can operate as a throwing or forced air spreading station.

Figure 4:
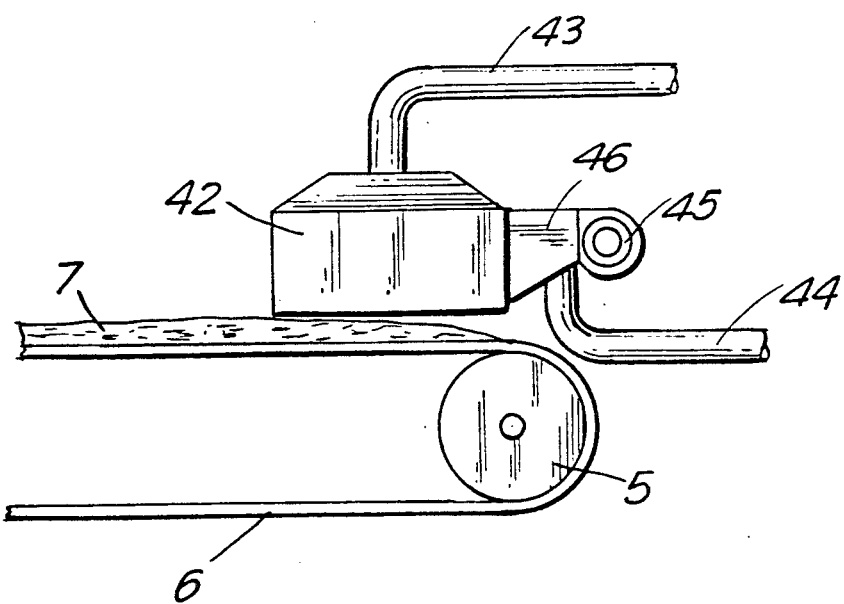
FIG. 4 is a schematic view of another embodiment of the device for spreading processed wood particles.

In FIG. 4, another device for spreading wood chips is shown. Spreading station 42 has a line 43 for the combination of the wood chips 37 and the binder without any hardener with the material being conveyed pneumatically through the line. A ventilator 45 is connected by a pipe section 46 to the spreading station 42. Line 44 extending from the device 47, note FIG. 5, supplies microcapsules 38 into the pipe section 46 where they are picked up and directed into the spreading station 42 by an air flow produced in the ventilator 45. In the spreading station 42, the wood chips 37, along with the binder, received through the line 43, are picked up by the air flow and spread, according to their dimensions, onto the conveyor belt 6, along with the microcapsules 38 contained in the air flow. Accordingly, the fleece 7 is formed on the conveyor belt 6 with the microcapsules 38 uniformly distributed through the wood chips 37. In spreading station 42, operated under a forced air flow, the microcapsules 38 are mixed with the wood chips 37 during the spreading step at the spreading station.

Figure 5:
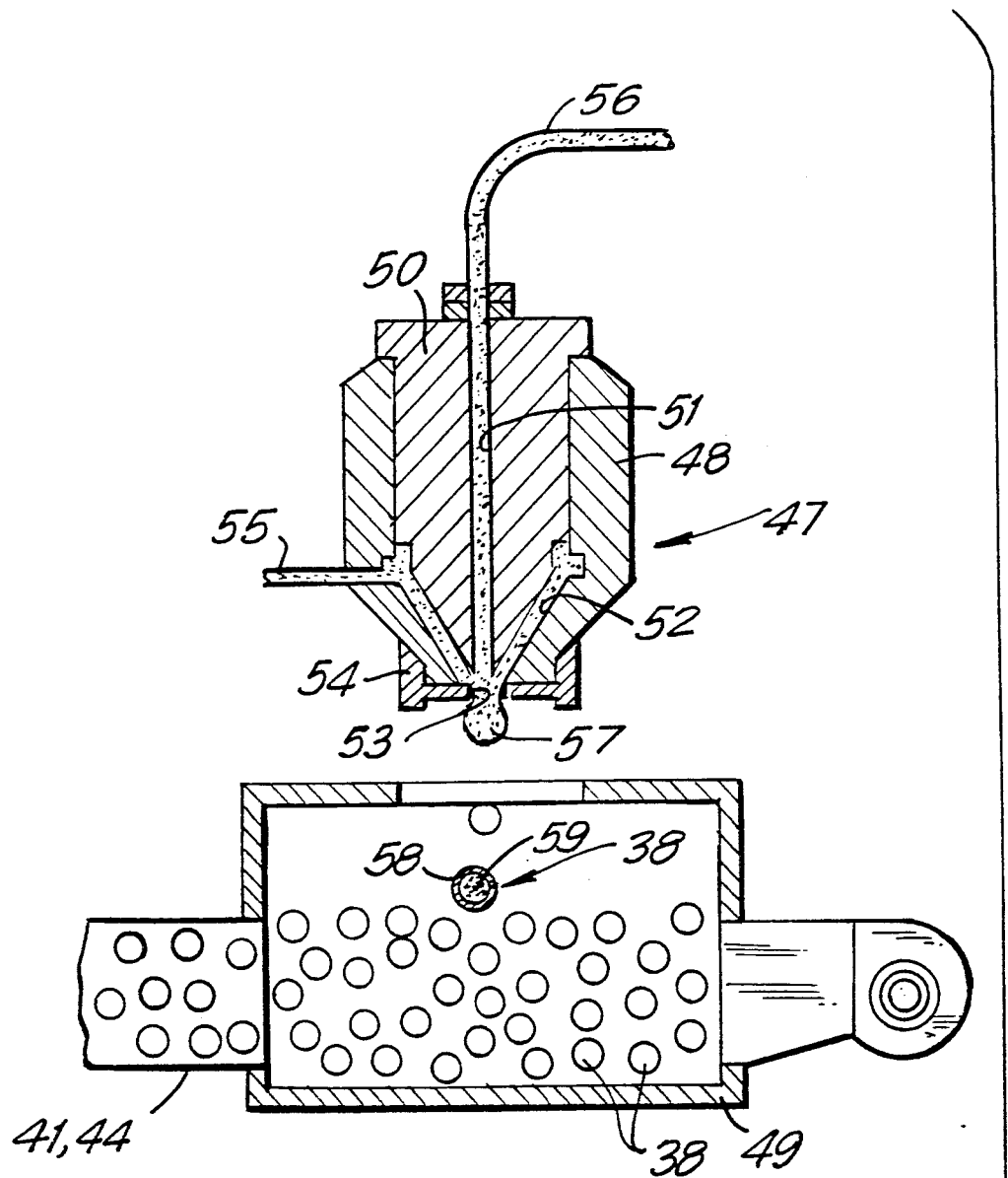
FIG. 5 is a sectional view through a device for producing microcapsules containing hardener.

The device 47 for producing microcapsules 38 is shown in detail in FIG. 5. This production device 47 includes a collecting vessel 49 with a nozzle head 48, aligned above the vessel. The nozzle head 48 has an insert 50, and a continuous channel 51 with a circular cross section which extends through the center of the insert. At its lower end, the insert 50 is conically shaped, tapering inwardly in the downward direction, and is spaced at a given distance inwardly from the inner wall of the nozzle head 48 so that a conically shaped annulus 52 is formed. Both the channel 51 and the annulus 52 open into joint circular aperture 53 in a nozzle mouthpiece 54, located at the lower end of the nozzle head 48. Fluid material for the closing wall of the microcapsules 38 is introduced into the annulus 52 through a line 55, extending through the wall of the nozzle head 48 into the annulus. The enclosing wall material, shown in FIG. 5, in wavy lines, flows downwardly through the annulus 52 and forms a membrane at the aperture 53 of the nozzle mouthpiece 54. Hardener, in a gaseous phase or a binary phase with a gaseous carrier agent, shown in the drawing by dots, is introduced under pressure through line 56 into the channel 51 and expands the membrane into a tear-shaped formation 57, extending downwardly from the aperture 53. The tear-shaped formation 57, forming the microcapsule 38, tears free from the nozzle mouthpiece 54, so that a closed capsule wall 58 encloses the gaseous hardener 59. Microcapsule 38, during its fall, has the tear-shaped formation, resembling a sphere to a great extent because of the surface tension, and drops into the collecting vessel 49. Another membrane of wall material is again formed at the aperture 53 at the nozzle mouthpiece 54, and the encapsulating process for the hardener is repeated. Microcapsules 38 collected in the vessel 49 are fed pneumatically to the mixing station 39, or the spreading station 42, via the line 41, 44, by a forced air flow produced by a fan 60 connected to the collecting vessel 49 on the opposite side from the line 41, 44.

Since the material supplied to the nozzle head 48 to form the microcapsule wall 58 is fluid, it must be hardened after the formation of the microcapsule to produce a stable encapsulating wall and prevent any premature release of the hardener 59 contained within the microcapsule. Chemical reactions, cooling and extraction or evaporation of solvents contained in the wall material can be considered as hardening means depending on the type of wall material. If the material for the microcapsule wall 58 is a melt, a cooling fluid can be present in the collecting vessel 49 acting as a hardening medium. During its fall from the nozzle mouthpiece 54, the microcapsule wall 5 cools until it is substantially stabilized. During entry into the collecting vessel 49, the microcapsule 38 enters the cooling fluid and cools completely, whereby the microcapsule wall 58 is completely rigidified and a firm envelopé encloses the hardener 59.

Device 47 for producing the microcapsules 38, and the mixing station 39, if present, should not be spaced too far from the spreading station 3, 42 to avoid damage to the microcapsule walls 58, due to an extensively long transporting distance. Moreover, it is advantageous if the spreading station 3, 42 is arranged as close to the entry into the press as possible to insure that the microcapsule walls 58 in the fleece are not dissolved during transportation into the press, so that a premature reaction of the binder with the gaseous hardener upstream from the press is safely avoided.

For duroplastic binders, conventionally used in the fabrication of chip boards, such as urea, formaldehyde or melamine formaldehyde resins, strong inorganic or organic acids act as particularly fast-acting hardeners which sharply accelerate the setting reaction of the resin. Such acids are, for instance, hydrochloric acid, sulfuric acid, phosphoric acid, formic acid, acetic acid, maleic acid and the like. Inorganic bases, such as ammonia, act as fast-acting hardeners for the phenolformaldehyde resins or resorciniol resins, which are also used as binders in the production of chip board. These acids or bases in gaseous phase or binary phase with a gaseous carrier agent are preferred as contents for the microcapsules 38. Hydrochloric gas has proven in tests to be a particularly suitable hardener.

As described above, the microcapsule walls 58 are destroyed during the compacting step in the wedge-shaped inlet region 22 due to the pressure exerted by the compaction of the wood chips on the microcapsules 38, so that the contents of the microcapsules are released. As an alternative to such mechanical destruction of the microcapsule walls 58, such walls can be formed of a material which is destroyed by heat. As a result, heat supplied to the fleece 7 from the press belts 20, 21 causes the microcapsule walls 58 to be destroyed during the compacting step. It is advantageous to select a material for the capsule walls which can be destroyed by heat at the process temperature selected for compressing the fleece. Such process temperature lies in the range of 70° to 110° C., as a rule.

Furthermore, a material can be used for the microcapsule wall which dissolves automatically after a given time period. If the device for producing the microcapsules 38 is arranged in the immediate vicinity of the double band press and the spreading of the wood chips 37 to form the fleece 7 is effected directly in advance of the double band press 1, where the microcapsules 38 are introduced into the fleece during the spreading step, a material can be selected for the microcapsule walls 58 which dissolves after approximately 15–30 seconds at the usual forward feed velocity of the press belts 20, 21 in the double band press 1. The various embodiments for destroying the microcapsule walls can also be combined. For example, a material for the microcapsule walls can be selected so that the walls are destroyed by the simultaneous action of the pressure and heat during the compacting step at the inlet to the double band press 1.

To encapsulate the hardener in an acceptable manner, the hardener 59 should not be soluble in the material forming the microcapsule walls 58. To prevent a premature release of the hardener 59 from the microcapsules 38, the material for the microcapsule walls should not react with the hardener nor with the binder. Polymers have proven to be a suitable material for the microcapsule walls and, in addition, paraffin, wax or gelatine have been found to be particularly suitable. Other wall material can be used, for instance, resin, asphalt, cellulose derivatives or plastics materials consisting of urea formaldehyde resin, polystyrene, polyethylene, polyepoxides and polyurethanes.

To obtain the most uniform and effective distribution of the microcapsules 38 in the fleece 7, it is preferable that the diameter of the microcapsules is in the range of approximately 500 to 1,000 micrometers. The density of the material for the microcapsule walls should be approximately 0.8 to 1.5 g/cm$^3$.

To produce the microcapsules 38 enclosing the hardener, a mechanical-physical process has been described above. The process, according to the present invention, is not limited to the described embodiment. Other physical processes using centrifuges, fluidized beds or vacuums could also be used. Furthermore, chemical processes can be employed with the gaseous hardener dispersed in a liquid phase and then microencapsulated. The wall formation for the microcapsules is effected in chemical processes by polycondensation, polyaddition, coacervation or complex coacervation.

Therefore, in view of the manner in which the claims have been amended, and the distinguishing features of the claims over the references cited, it is submitted that the claims presently in the application are now in condition for allowance and such allowance is respectfully requested.

I claim:

1. Apparatus for fabricating processed wood material panels, including chip boards, fiberboards, OSB (oriented structural board) panels, and MDF (medium density fiberboard) panels, formed of processed wood materials bonded together with a binder, including urea, melamine and phenolformaldehyde resin and cured with the addition of a hardener, comprising means for forming a spreading station for spreading the wood material particles with the binder onto a conveying surface and forming a fleece of the particles and binder thereon, a press for first compacting the fleece and then pressing the compacted fleece to form a processed wood panel, and said conveying surface transporting the fleece and then pressing the compacted fleece to form a the improvement comprises means (47) for producing microcapsules (38) containing one of an acid and base hardener in one of a gaseous phase and a binary phase with a gaseous carrier agent, said press having an inlet end for receiving the fleece and an outlet end for discharging the compacted and pressed fleece in the form of a processed wood panel, said means for producing microcapsules located adjacent to the inlet end of said press, means forming a separate mixing station located one of at or immediately upstream of the spreading station for mixing the microcapsules with the binder and wood particles, said spreading station located adjoining the inlet end of the press for avoiding premature destruction of the microcapsules, conduit means (41, 44) for providing direct flow communication between said microcapsules producing means and said spreading station said press comprises a continuously operating double band press (1) having an upper endless press belt (20) and a lower endless press belt (22) with said upper and lower press belts extending for a first section toward but spaced from the outlet end forming an average pressure reaction zone (23), and a third section of said press belts extending from the outlet end to said second section and forming a low pressure shape-maintenance zone (24), so that the fleece is continuously compacted in the wedge shaped first section with the microcapsules being broken during compaction of the fleece and releasing the gaseous hardener into the interior of the fleece whereby curing of the binder commences and subsequently the fleece is pressed into a wood material panel web in the second and third sections of the double band press.

2. Apparatus, as set forth in claim 1, wherein said means for producing microcapsules (47) comprises a collecting vessel (49) for the microcapsules, a nozzle head located above the collecting vessel and including an insert located in said nozzle head with an upwardly extending continuous channel (51) through said insert, said nozzle head and said insert combining to form an annular passage (52) therebetween with said passage extending in the upward direction, said annular passage located in a lower portion of the nozzle head, said annular passage having a lower end opening to a common aperture (53) in a nozzle mouthpiece (54) located at the lower end of said nozzle head, a supply line (55) for flowing fluid raw material for the microcapsule wall through said nozzle head into said annular passage and another supply line (56) for flowing hardener into said channel downwardly toward said common aperture, so that microcapsules are formed at the joint aperture in the nozzle mouthpiece as tear-shaped elements.

3. Apparatus, as set forth in claim 2, including a hardening medium into said collecting vessel (49) for hardening the microcapsule walls (49).

4. Apparatus, as set forth in claim 2, wherein a fan (60) is mounted on and communicates with the interior of said collecting vessel (49), said fan (60) generates a forced air flow for pneumatically transferring the microcapsules from the collecting vessel to said mixing station and spreading station via said conduit means (41, 44).

* * * * *